United States Patent [19]

Betts

[11] 4,413,377
[45] Nov. 8, 1983

[54] SHRIMP STRIPPER

[75] Inventor: Edmund D. Betts, Libertyville, Ill.

[73] Assignee: Gregor Jonsson Associates, Inc., Highland Park, Ill.

[21] Appl. No.: 296,528

[22] Filed: Aug. 26, 1981

[51] Int. Cl.[3] .............................................. A22C 29/02
[52] U.S. Cl. ........................................... 17/73; 17/48
[58] Field of Search ................... 17/71, 72, 73, 48, 66

[56] References Cited

U.S. PATENT DOCUMENTS

| | | | |
|---|---|---|---|
| 1,728,801 | 9/1929 | McCutcheon | 17/66 X |
| 2,784,450 | 3/1957 | Jonsson | 17/72 X |
| 3,164,859 | 1/1965 | Ambos et al. | 17/48 |

Primary Examiner—Willie G. Abercrombie
Attorney, Agent, or Firm—Merriam, Marshall & Bicknell

[57] ABSTRACT

There is disclosed a shrimp processing machine which includes a new and improved means for separating the shrimp meat from the shrimp shells. The machine includes a plurality of processing stations including a meat separating station which separates the shrimp meat from the shrimp shells. The machine also includes a carrier for transferring the shrimp through the processing stations and a conveyor means for conveying the shrimp to be processed to the carrier. The carrier is arranged to transfer the shrimp along a descending path through the meat separating station. The meat separating station includes a plurality of spike members or tines which are arranged for reciprocal movement to a protracted position into the shrimp for penetrating the shrimp and coacting with the carrier for separating the shrimp meat from the shrimp shells and to a retracted position for movement out of the shrimp meat for releasing the separated shrimp meat. In the disclosed preferred embodiment, the tines include an elongated shaft portion and a tip portion, wherein the tip portions are disposed at an angle from the shaft portions and point in a direction generally opposite to the direction of shrimp transfer by the carrier.

21 Claims, 5 Drawing Figures

U.S. Patent     Nov. 8, 1983     4,413,377
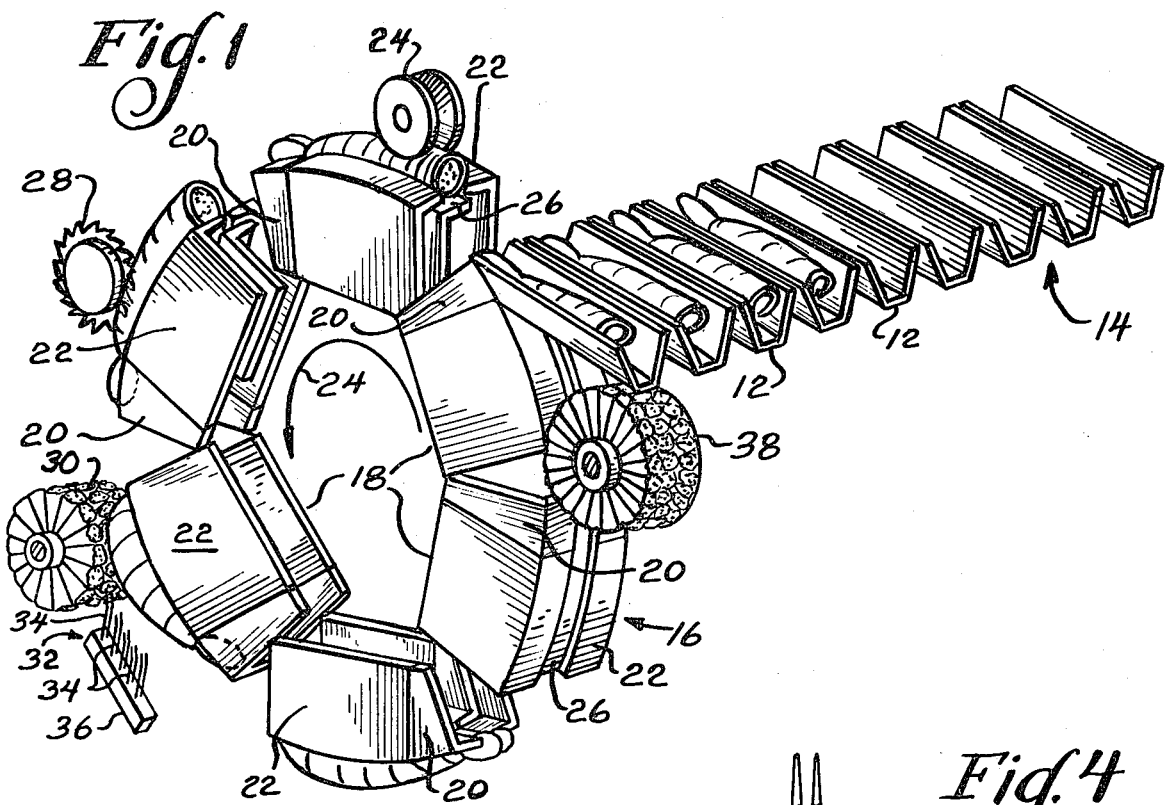
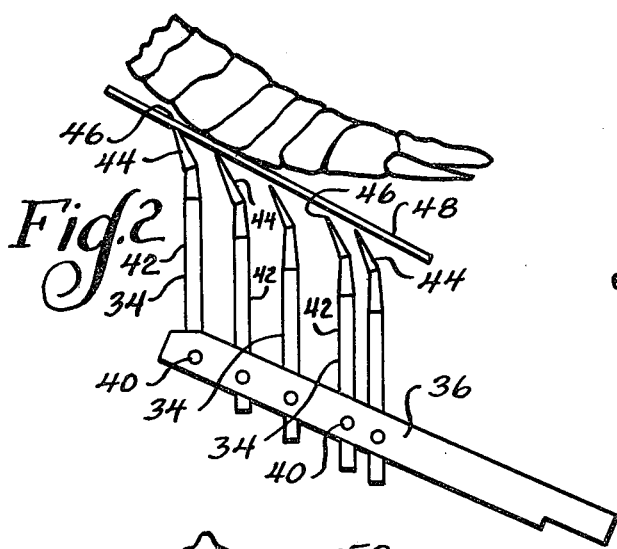
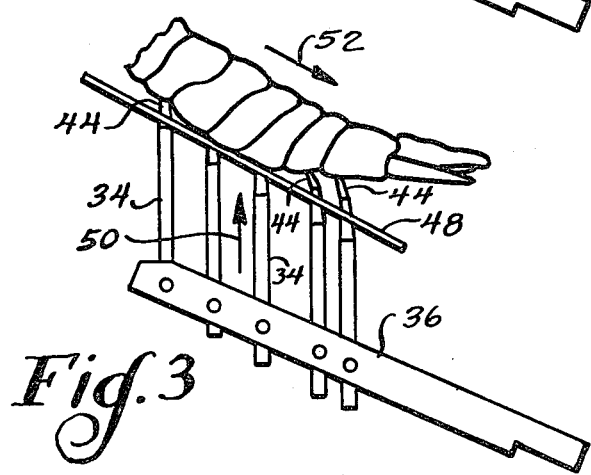
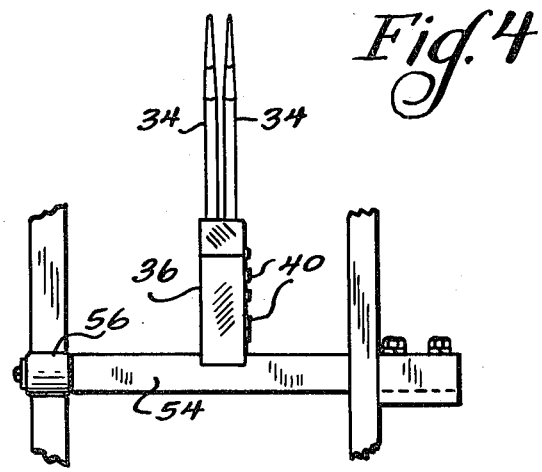
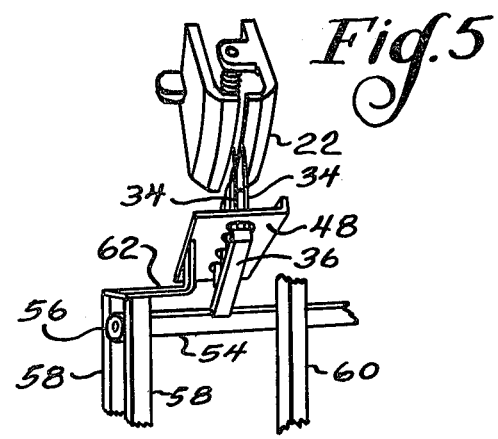

SHRIMP STRIPPER

BACKGROUND OF THE INVENTION

The present invention is generally directed to the processing of food, and more particularly to a machine for cleaning shrimp.

The edible portion of a shrimp is covered with a shell and contains an inedible sand vein near its back. This vein must be removed before a shrimp is canned, frozen, or cooked and is also desirable to remove the shrimp meat from the shell.

Hand removal of the veins and shelling is tedious and inefficient and consequently is most undesirable when large numbers of shrimp must be handled. Many shrimps are seined from water in hot climates. Thus, the shrimps must be promptly processed in very large numbers. In order to reduce the required amount of hand work for removing the veins from shrimp and separating the meat and shells, various forms of shrimp cleaning machines have been devised. Satisfactory machines are described in U.S. Pat. Nos. 2,850,761; 3,214,789; and 3,238,561. The machines disclosed in those patents include a carrier comprising a plurality of circularly arranged clamps which gripped the shrimps and transferred the shrimps along a circular path through various processing stations which deveined the shrimps and separated the shrimp meat from the shells. The processing station for separating the shrimp meat from the shells included a plurality of spikes or tines located adjacent to the carrier clamps at the bottom of the circular transfer path arc of the shrimps. The spikes or tines projected upwardly and were arranged to move in a vertical direction for penetrating the shrimp meat. As the spikes penetrated the shrimp meat, the spikes coacted with the revolving clamps which gripped the shrimp shells for separating the shrimp meat from the shells. After the meat separation, the spikes were retracted from the meat to thereby release the separated meat.

Although the shrimp cleaning machines described in the aforementioned patents provided substantial improvement over machines of the prior art, there remained room for improvement. For example, because the meat separator spikes engaged the shrimp meat at nearly a right angle to the shrimp carrier direction of motion, tearing of the meat during the initial phase of penetration sometimes developed. This of course is undesirable, inasmuch as it affects the appearance of the separated meat. Furthermore, the vertically moving spikes or tines did not always securely grip the shrimp meat to assure consistent separation of the shrimp meat and the shell.

It is therefore a general object of the present invention to provide a new and improved shrimp processing machine.

It is a further object of the present invention to provide a shrimp processing machine which includes an improved shrimp meat processing station for separating the shrimp meat from the shrimp shells.

It is a still further object of the present invention to provide such a shrimp processing machine which includes a meat separating processing station which assures consistent separation of the shrimp meat from the shells while decreasing the likelihood of tearing and which therefore preserves the shape and structural integrity of the separated meat.

The invention therefore provides a shrimp processing machine comprising shrimp carrier means arranged to grip and transfer the shrimp in seratim along a vertical, circular path and a plurality of processing stations along the circular path. The processing stations include a meat separating station adjacent to a descending portion of the circular path. The meat separating station includes a plurality of spike members or tines arranged for movement into the shrimp and for coacting with the carrier means to separate the shrimp from the shrimp shells. Because the spike members penetrate the shrimp meat along a descending path of the shrimp, the spike members are provided with a better grip of the shrimp and the carrier is allowed to pull the shrimp shell downwardly away from the meat to assure more efficient and effective separation of the shrimp meat and shells.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawings, in the several figures of which like reference numerals indicate identical elements, and wherein:

FIG. 1 is a perspective view, partially in schematic form, illustrating a shrimp cleaning machine embodying the present invention;

FIG. 2 is a partial side elevational view of the machine of FIG. 1 illustrating the meat separating processing station embodying the present invention in greater detail;

FIG. 3 is a side elevational view similar to FIG. 2 illustrating the operation of the meat separating processing station of FIG. 2;

FIG. 4 is a partial rear elevational view illustrating in greater detail the spike members or tines of the meat separating station and the manner in which they are arranged for reciprocal movement; and FIG. 5 is a partial perspective view of the meat separating station embodying the present invention looking towards the rearward side thereof.

DESCRIPTION OF THE PREFERRED EMBODIMENT

Referring now to FIG. 1, there is shown in partially schematic perspective form the processing stations and shrimp carrier which transforms the shrimp through the various processing stations embodying the present invention. The apparatus illustrated in FIG. 1 may be, preferably, incorporated into a shrimp cleaning machine as fully illustrated and described in the aforementioned U.S. Pat. Nos. 2,850,761; 3,214,789; and 3,238,561 which are incorporated herein by reference.

The apparatus of FIG. 1 includes a plurality of receptacles or trays 12 of channel or troughlike shape which receive the shrimp to be processed and form a conveyor 14. The shrimps are first beheaded and then are manually inserted in the trays 12. The conveyor 14 is intermittently operable and the tails of the shrimp project outwardly therefrom. The conveyor 14 passes over a rotary or disc conveyor or carrier 16. The carrier 16 comprises a plurality of sets of clamps 18. Each set of clamps 18 comprises a tail clamp 20 and a body clamp 22. The direction of rotation of the carrier 16 is indicated by the arrow 24 such that the tail clamps 20 lead the body clamps 22. The carrier 16 and conveyor 14 are operated in timed relation so that tails of the shrimps are successively gripped by the clamps 20 to pull the shrimps from the trays 12 whereupon they are gripped by the body clamps 22.

As the clamp sets ascend beneath the conveyor trays 12, the clamp sets are open. Each tail clamp closes opposite a conveyor tray 12, the loading conveyor being stationary at this time, to clamp the tail of a shrimp thereby to pull the shrimp from the conveyor tray. The bodies of the shrimp are pushed down part way into the spaces between the body clamps 22 by a grooved roller 24 against a back-up plate 26 whereupon the body clamps 22 are closed. The underside or belly of a shrimp is provided with a number of appendages and is rather soft. The underside or belly is thereby pinched or clamped between the clamps 22.

Rotation of the carrier 16 transfers each shrimp along a circular path through a plurality of processing stations. The first such processing station includes a rotating knife or saw 28 which slits the shell of the shrimp down the back and at the same time cuts slightly through into the meat of the shrimp to pull out the sand vein. The pinching of the belly between the body clamps 22 causes the shell to spread apart along the slit as soon as it is cut by the knife 28.

Continued rotation of the carrier 16 transfers each shrimp to a debris removing station comprising a rotary brush 30. The debris removing station may also include a water jet, not shown (but see Jonsson U.S. Pat. No. 3,214,789 for nozzle 202). Debris is thus removed leaving only the clean meat and shell. Continued rotation of the carrier 16 transfers each shrimp into position above a meat separating station embodying the present invention. The meat separating station generally indicated at 32 is positioned adjacent the clamp sets 18 along a descending portion of the circular transfer path of the shrimp provided by the carrier 16. The meat separating station 32, to be described in greater detail hereinafter, includes a plurality of spike members or tines 34 mounted on a block or bar 36 having sides 36'. The bar 36 and thus the spike members 34 are arranged for vertical reciprocal movement. The spike members 34 periodically move up in timed relation to the movement of the carrier 16 and at a very rapid rate to penetrate the meat of the shrimp without tearing the meat. The carrier 16 then moves with the meat impaled on the spike members so that the body clamps 22 pull the shell longitudinally and downwardly away from the meat.

The spike members 34 are then retracted and the separated meat is released. A water spray (not shown) then moves the meat away from the meat separating station for collection.

The shells of the shrimp are carried beyond the end of the meat separating station 32 to be dropped for collection. Also, a rotating brush 38 is positioned adjacent the periphery of the carrier 16 for cleaning the clamps 18.

Referring now to FIGS. 2 through 5, the meat separating station is there shown in greater detail. In FIG. 2 it can be seen that the spike members or tines are mounted to the bar 36 by rivets 40 or other suitable securing means. The spike members 34 each include a shaft portion 42 and a tip portion 44. The tip portions 44 are disposed at an angle with respect to the shaft portions 42 and point generally in a direction opposite to the direction of movement of a shrimp during transfer by the carrier 16. The spike members 34 further terminate at their tips 46 such that the tips 46 are arranged along a line generally corresponding to the transfer path of the shrimp. Between the spike members 34 and the shrimp there is disposed a perforated or appertured plate 48 which allows the spike members 34 to pass therethrough and into the shrimp when the spike members are moved to their protracted position for piercing the shrimp meat. As can be seen in FIGS. 2 and 3, the perforated plate 48 is disposed in substantially parallel relation to the descending direction of shrimp transfer.

Referring now to FIG. 3, it can be seen that the spike members 34 are caused to move upwardly as indicated by arrow 50 through the perforated plate 48 for penetrating the meat of the shrimp as the shrimp is transferred by the carrier 16 in the descending direction indicated by arrow 52. Because the body clamps 22 maintain a firm grip on the shrimp shells, the spike members 34 and carrier clamps 22 coact for separating the shrimp meat from the shells. More specifically, the spike members 34 by virtue of the angled disposition of the tip portions 44 maintain a firm grip on the shrimp meat to hold it stationary while the body clamps 22 of the carrier 16 pull the shrimp shell downwardly and away from the shrimp meat. After separation, the spike members 34 are retracted and caused to move downwardly. As this occurs, the separated meat is held in a fixed vertical position by the perforated plate 48 to assist in the release of the separated meat.

Referring now to FIGS. 4 and 5, the spike members 34 are arranged in two rows and in line with the direction of shrimp transfer by the carrier 16. The bar 36 which supports the spike members 34 is secured to a cross bar 54 which includes a roller shown at 56. The roller 56 is positioned between a pair of vertically disposed bars 58 which guide the vertical reciprocal movement of the cross bar 54 and thus the spike members 34 and the bar 36 to which they are mounted. Secured to the cross bar 54 is another vertically disposed bar 60 which is connected to a suitable apparatus such as a cam follower (not shown) which imparts the vertical reciprocal movement to the bar 60 and thus the cross bar 54. The perforated plate 48 is mounted to the vertically disposed bars by an L-bracket 62 which disposes the perforated plate 48 in a declined orientation substantially parallel to the direction of shrimp transfer by the carrier 16.

Lastly, attention is once again directed to FIG. 2 where it can be seen that the angle between the tip portions 44 and shaft portions 42 of the spike members 34 varies in the direction of shrimp transfer. For example, the angle between the tip portions 44 and shaft portions 42 decreases (becomes less obtuse) for progressive spike members along the descending path in the direction of shrimp transfer. This assures that the shrimp will be penetrated by the spike members 34 in a manner which prevents tearing of the shrimp meat and thus prevents clogging of the apparatus when the spike members 34 are retracted out of the meat.

From the foregoing, it can be seen that the present invention provides a new and improved shrimp processing machine. The shrimp processing machine of the present invention includes a new and improved shrimp meat separating station which minimizes tearing of the shrimp meat. Efficient and effective separating of the shrimp meat from the shells is assured by virtue of the fact that the meat separating station is located along a descending path of transfer of the shrimp. Furthermore, the meat separating station includes a plurality of spike members having tip portions which are disposed at an angle from corresponding shaft portions and pointing in a direction generally opposite to the descending path of shrimp transfer. As a result, a secure grip on the shrimp meat is assured while the carrier clamps pull the shells from the shrimp meat longitudinally and downwardly away from the shrimp meat. As a result of the foregoing, the shrimp meat is separated from the shells in an efficient manner and in a manner which assures that tearing of the meat will not result.

While a particular embodiment of the present invention has been shown and described, modifications may be made, and it is therefore intended to cover in the appended claims all such changes and modifications which fall within the true spirit and scope of the invention.

The invention is claimed as follows:

1. A shrimp processing machine comprising: a plurality of processing stations including a meat separating station for separating the shrimp meat from the shrimp shells; and carrier means for transferring the shrimp through said processing stations, said carrier means being arranged to transfer the shrimp along a descending path through said meat separating station, and said meat separating station including a plurality of spike members, each said spike member including an elongate shaft portion and a tip portion, said tip portions being disposed at an angle from said shaft portions and pointing in a direction generally opposite to the direction of shrimp transfer by said carrier means, and said spike members being arranged for reciprocal movement to a protracted position into a shrimp for penetrating the shrimp and coacting with said carrier means for separating the shrimp meat from the shrimp shells and to a retracted position for movement out of the shrimp meat for releasing the separated shrimp meat.

2. A machine as defined in claim 1 wherein said tip portions of said spike members terminate along a line generally parallel to said descending path of transfer of the shrimp.

3. A machine as defined in claim 1 wherein said spike members are arranged in line with said descending transfer path of the shrimp and wherein the angle between said tip portions and said shaft portions of said spike members decreases for progressive spike members along said descending path in the direction of shrimp transfer.

4. A machine as defined in claim 1 wherein said meat separating station further includes a perforated plate disposed between said spike members and the shrimp whereby when said spike members are in said retracted position, said plate is arranged to allow said spike members to pass therethrough for penetrating the shrimp; and, said plate is arranged to hold the shrimp as said spike members are withdrawn from the shrimp to assist in the release of the separated shrimp meat.

5. A machine as defined in claim 4 wherein said perforated plate is disposed substantially parallel to said descending path.

6. A shrimp processing machine comprising: shrimp carrier means arranged to grip and transfer the shrimp in seritim along a vertical circular path; and a plurality of processing stations along said circular path including a meat separating station adjacent to a descending portion of said circular path, said meat separating station including a plurality of spike members having tip ends terminating along a line substantially corresponding to said circular path, and shaft portions supporting said tip ends, said tip ends being angularly disposed from said shaft portions and pointing in a direction generally opposite the direction of the shrimp transfer along said circular path, said spike members also being arranged for movement into the shrimp for coacting with said carrier means to separate the shrimp meat from the shrimp shells, and out of said separated shrimp meat for releasing said separated shrimp meat.

7. A machine as defined in claim 6 wherein said meat separating station further includes an apertured plate disposed between said spike members and said circular path and arranged to allow said spike members to pass therethrough to assist in releasing the separated shrimp meat from said spike member.

8. A shrimp processing machine of the type which is arranged to separate the shrimp meat from the shrimp shells comprising: a meat separating station including plural pairs of tines arranged for movement into and out of the shrimp, said tines including shaft portions and tip portions carried by said shaft portions and disposed at an angle relative to said shaft portions pointing towards the shrimp, and carrier means for gripping the shrimp shells and transferring the shrimp through said meat separating station along a descending path, said carrier means and said tines being arranged to coact as said tines enter the shrimp for separating the shrimp meat from the shrimp shells.

9. A machine as defined in claim 8 wherein said plural pairs of tines are successively arranged along said descending path and wherein the angles between said tip portions and said shaft portions are less obtuse for progressive tine pairs along said descending path.

10. A shrimp processing machine of the type which is arranged to separate the meat of the shrimp from the shells of the shrimp comprising: a meat separating station including a plurality of successive tines arranged from movement to enter the shrimp and to be withdrawn from the separated shrimp meat; and carrier means for gripping the shrimp shells and transferring the shrimp to said tines along a descending path, said tines being disposed along said descending path and including tip portions and shaft portions, said tip portions being at an angle from said shaft portions and pointing generally towards the shrimp, said angle between said tip portions and said shaft portions being less obtuse for successive tines along said descending path for providing a firm stationary hold on the shrimp meat as said carrier pulls the shrimp shells from the shrimp meat.

11. An apparatus for use in a shrimp cleaning machine which apparatus is adapted to assist in the separation of the shrimp meat from the shrimp shells comprising: a mounting block having two sides; a plurality of tines mounted on said mounting block, said tines having shaft portions and tip portions; said tip portions extending outwardly from only one side of said mounting block; said tines being arranged along said mounting block with their shaft portions substantially parallel; said tip portions being disposed at an angle with respect to said shaft portions; and stripping means for stripping shrimp meat from said tines.

12. An apparatus as defined in claim 11 wherein all said tip portions are arranged to point in the same general direction.

13. An apparatus as defined in claim 11 wherein the angles between said tip portions and said shaft portions are progressively less obtuse for successive tines along said mounting block.

14. An apparatus as defined in claim 13 wherein said tip portions terminate along a line generally defining a descending path.

15. An apparatus as defined in claim 11 wherein said tines are arranged in successive pairs along said mounting block.

16. An apparatus as defined in claim 15 wherein the angles between said tip portions and said shaft portions are progressively less obtuse for successive tine pairs along said mounting block.

17. An apparatus as defined in claim 16 wherein said tip portions terminate at points defining a generally descending plane.

18. A shrimp processing machine comprising: a meat separating station; and carrier means traveling in one direction for gripping the shrimp shells and transferring the shrimp to said meat separating station along a descending path, said meat separating station including means for holding the shrimp meat in a stationary position as said carrier means pulls the shrimp shells longitudinally and downwardly away from the shrimp meat for separating the shrimp meat from the shrimp shell; and, said shrimp meat holding means further including means for entering the shrimp in a direction opposite the direction of travel of said carrier means.

19. A shrimp processing machine in accordance with claim 18 wherein said shrimp holding means include a plurality of tines having a shaft portion and a top portion located at one end of said shaft portion.

20. A shrimp processing machine in accordance with claim 19 and further including an apertured plate with said tines being adapted to pass through said apparatus.

21. An apparatus in accordance with claim 11 wherein said stripping means comprises an apertured plate with said tines being adapted to pass through said aperture.

* * * * *